(12) United States Patent
Cornejo et al.

(10) Patent No.: US 12,357,973 B2
(45) Date of Patent: Jul. 15, 2025

(54) PROCESS OF CONTROLLING THE MORPHOLOGY OF GRAPHITE

(71) Applicant: HAZER GROUP LTD., Perth (AU)

(72) Inventors: Andrew Cornejo, Winthrop (AU); Hui Tong Chua, Mount Claremont (AU); Haibo Lu, Willetton (AU)

(73) Assignee: HAZER GROUP LTD. (AU)

( * ) Notice: Subject to any disclaimer, the term of this patent is extended or adjusted under 35 U.S.C. 154(b) by 0 days.

(21) Appl. No.: 18/195,530

(22) Filed: May 10, 2023

(65) Prior Publication Data

US 2023/0356197 A1    Nov. 9, 2023

Related U.S. Application Data

(63) Continuation of application No. 15/754,790, filed as application No. PCT/AU2016/000298 on Aug. 26, 2016, now Pat. No. 11,691,126.

(30) Foreign Application Priority Data

Aug. 26, 2015  (AU) ................ 2015903458

(51) Int. Cl.
    *B01J 23/745*   (2006.01)
    *B01J 35/30*    (2024.01)
    (Continued)

(52) U.S. Cl.
    CPC ............ *B01J 23/745* (2013.01); *B01J 35/30* (2024.01); *C01B 32/15* (2017.08); *C01B 32/162* (2017.08);
    (Continued)

(58) Field of Classification Search
    CPC ..... C01B 32/205; C01B 32/15; C01B 32/186; C01B 32/20; C01B 32/184; C01B 32/162;
    (Continued)

(56) References Cited

U.S. PATENT DOCUMENTS 3,284,161 A * 11/1966 Pohlenz .............. C01B 3/44
                                                422/144
8,052,921 B2   11/2011 Shin et al.
                (Continued)

FOREIGN PATENT DOCUMENTS

CN       103058169 A      4/2013
EP       2639329 A2       9/2013
                (Continued)

OTHER PUBLICATIONS

Machine Translation of WO 2015/017952 to Shan-Dong Dazhan Nanomaterials Co. Ltd. (Dec. 2015) (Year: 2015).*
(Continued)

*Primary Examiner* — Daniel C. McCracken
(74) *Attorney, Agent, or Firm* — The Belles Group, P.C.

(57) ABSTRACT

A process of controlling the morphology of graphite in a process for the production of graphite, the process comprising: contacting at elevated temperature, a metal-containing catalyst with a hydrocarbon gas to catalytically convert at least a portion of the hydrocarbon gas to hydrogen and carbon; wherein the temperature is between 600° C. and 1000° C. and a pressure between 0 bar(g) and 100 bar(g), and wherein both the temperature and the pressure are set within predetermined value ranges to selectively synthesize graphitic material with a desired morphology.

17 Claims, 7 Drawing Sheets

(51) Int. Cl.

| | |
|---|---|
| *C01B 32/15* | (2017.01) |
| *C01B 32/162* | (2017.01) |
| *C01B 32/18* | (2017.01) |
| *C01B 32/184* | (2017.01) |
| *C01B 32/186* | (2017.01) |
| *C01B 32/205* | (2017.01) |
| *D01F 9/127* | (2006.01) |

(52) U.S. Cl.
CPC ............ *C01B 32/18* (2017.08); *C01B 32/184* (2017.08); *C01B 32/186* (2017.08); *C01B 32/205* (2017.08); *D01F 9/127* (2013.01); *D01F 9/1272* (2013.01)

(58) Field of Classification Search
CPC ....... C01B 32/18; D01F 9/127; D01F 9/1272; B01J 35/002; B01J 23/745
See application file for complete search history.

(56) References Cited

U.S. PATENT DOCUMENTS

| | | | |
|---|---|---|---|
| 11,691,126 B2* | 7/2023 | Cornejo | C01B 32/162 |
| | | | 423/447.2 |
| 2002/0172767 A1 | 11/2002 | Grigorian et al. | |
| 2005/0079119 A1 | 4/2005 | Kawakami et al. | |
| 2006/0057054 A1* | 3/2006 | Fujioka | D01F 9/127 |
| | | | 422/600 |
| 2006/0257310 A1 | 11/2006 | Tada et al. | |
| 2008/0118426 A1 | 5/2008 | Li et al. | |
| 2008/0159938 A1 | 7/2008 | Mauthner et al. | |
| 2008/0210908 A1 | 9/2008 | Zhu et al. | |
| 2009/0110627 A1* | 4/2009 | Choi | B82Y 40/00 |
| | | | 252/502 |
| 2012/0258374 A1* | 10/2012 | Raston | C01B 32/205 |
| | | | 429/411 |
| 2014/0328749 A1* | 11/2014 | Hammel | C01B 3/28 |
| | | | 422/162 |

FOREIGN PATENT DOCUMENTS

| | | |
|---|---|---|
| JP | 2009521606 A | 12/2005 |
| JP | 2012158790 A | 7/2012 |
| KR | 100741139 B1 | 7/2007 |
| KR | 101408751 B1 | 6/2014 |
| RU | 2225051 C2 | 2/2004 |
| RU | 2430432 C2 | 9/2011 |
| RU | 2660493 C1 | 7/2018 |
| SU | 958994 A1 | 9/1982 |
| SU | 1482768 A1 | 5/1989 |
| WO | 2007136755 A2 | 11/2007 |
| WO | 2009145936 A1 | 12/2009 |
| WO | 2010120581 A1 | 10/2010 |
| WO | 2013109310 A1 | 7/2013 |
| WO | 2013111015 A1 | 8/2013 |
| WO | 2015/017952 A | 2/2015 |
| WO | WO 2015/017952 * 12/2015 ............. C01B 31/02 |
| WO | 2016154666 A1 | 10/2016 |

OTHER PUBLICATIONS

Fitzer, et al., Recommended Terminology for the Description of Carbon as a Solid, Pure & Appl. Chem. 1995; 67(3): 73-506 (Year: 1995).*
Bianco, et al. Editorial: All in the graphene family—A recommended nomenclature for two-dimensional carbon materials, Carbon 2013; 65: 1-6 (Year: 2013).*
Jang, et al., Hydrogen production by the thermocatalytic decomposition of methane in a fluidized bed reactor, Korean J. Chem. Eng. 2007; 24(2): 374-377 (Year: 2007).006637*
"Overpressure," accessed online at https://www.dictionary.com/browse/overpressure on Sep. 12, 2024 (Year: 2024).*
Machine translation of WO 2015/017952 to Shan-Dong Dazhan Nanomaterials Co., Ltd. (Dec. 2, 2015) (Year: 2015).*
Srinivasan, Reduction of iron oxides by carbon in a circulating fluidized bed reactor, Powder Technology 2002; 124: 28-39 (Year: 2002).*
Mauron, et al., Fluidised-bed CVD synthesis of carbon nanotubes on Fe2O3/MgO, Diamond and Related Materiaos 2003; 12: 780-785 (Year: 2003).*
Go, et al., Hydrogen production from two-step steam methane reforming in a fluidized bed reactor, International Journal of Hydrogen Energy 2009; 34: 1301-1309 (Year: 2009).*
Feilmayr, et al., Reduction Behavior of Hematite to Magnetite under Fluidized Bed Conditions, ISIJ International 2004; 44(7): 1125-1133 (Year: 2004).*
The thermo-catalytic decomposition of methane for economical and emission-free hydrogen production, accessed online at https://onesearch.library.uwa.edu.au/permalink/61 UWA_INST/1vk1d8f/alma9946329202101 on Feb. 9, 2023 (Year: 2023).
Ermakova, et al., Decomposition of Methane over Iron Catalysts at the Range of Moderate Temperatures: The Influence of Structure of the Catalytic Systems and the Reaction Conditions on the Yield of Carbon and Morphology of Carbon Filaments, Jouranl of Catalysis 2001; 201: 183-197 (Year: 2001).
Sushil, et al., Carbon deposition and phase transformations in red mud on exposure to methane, Journal of Jazardous Materials 2010; 180: 409-418 (Year: 2010).
Cornejo, The Thermo-catalytic Decomposition of Methane for Economical and Emission-Free Hydrogen Production, Thesis Presented for the Degree of Doctor of Philosophy of the University of Western Australia, School of Mechanical and Chemical Engineering 2013, 207 pages (Year: 2013).
Nang et al., "Low-temperature synthesis of graphene on Fe2O3 using inductively coupled plasma chemical vapor eposition", Materials Letters 92 (2013), pp. 437-439.
Wesolowski et al., "Self-assembly of thin carbon micro-shells through pulsed laser irradiation of a ferrocene/benzene solution" 48(18) J. Mater Sci (May 8, 2013), pp. 6212-6217.
Scientific Background on the Nobel Prize in Physics 2010 Graph Ene compiled by the Class for Physics of the Royal Swedish Academy of Sciences, pp. 1-10 (Oct. 5, 2010) (Year: 2010).
Fitzer, et al., Recommended Terminology for the Description of Carbon as a Solid, Pure & Appl. Chem. 1995; 67(3): 473-506 (Year: 1995).
Gao, L. el al.: Methane catalytic cracking lo make COx free Hydrogen and carbons (nanolubes, microfibers, microballs), Advanced Materials Research vols. 79-82 (2009) pp. 585-588.
Ahmed E. Awadallah el al: "Catalytic Decomposition of Natural Gas to CO/C02-Free Hydrogen Production and Carbon Nanomaterials Using MgO-Supported Monometallic Iron Family Catalysts" Chemical Engineering Communications (2015) vol. 202, No. 2, pp. 163-174, Published online Apr. 24, 2014.
Wadallah et al., "Catalytic Decomposition of Natural Gas to CO/C02-Free Hydrogen Production and Carbon Nanomaterials Using MgO-Supported Monometallic Iron Family Catalysts", 202(2) Chem. Engin.Comm. (Sep. 15, 2014), pp. 163-174.
Yao, "Synthesis of Carbon Nanotubes, Carbon Spheres and Slices of Vertically Aligned Multi-Walled Carbon Nanotubes", 306-307 Advanced Mater. Res. (Aug. 1, 2011), pp. 1325-1329.
Hong et al., "Selective preparation of carbon nanoflakes, carbon nanospheres, and carbon nanotubes through t: arbonization of polymethacrylate by using different catalyst precursors", 130(2) J. Appl. Polymer Sci. (Oct. 15, 2013), Dgs. 1029-1037.
Nang et al., "Low-temperature synthesis of graphene on Fe2O3 using inductively coupled plasma chemical vapor eposition", 92 Materials Lett. (Feb. 1, 2013), pp. 437-439.
Hyun Tae Jang and Wang Seog Cha: "Hydrogen production by the thermocatalytic decomposition of methane in a huidized bed reactor" Korean Journal of Chemical Engineering 92007), 24(2), pp. 374-377.
Kiong et al: "Effect of temperature, pressure, and gas ratio of methane to hydrogen on the synthesis of double- Walled carbon nanotubes by chemical vapour deposition" Nanotechnology (2005) vol. 16, No. 4, pp. 532-535.

(56) References Cited

OTHER PUBLICATIONS

Zhang et al., "Effect of Ni, Fe and Fe—No alloy catalysts on the synthesis of metal contained nano-onions and studies . . . ", 23(3) J. Energy Chem. (May 1, 2014), pp. 324-330.

Zhang et al., "The efficient synthesis of carbon nanoonios using chemical vapor deposition on an unsupported Ni—Fe alloy catalyst", 49(4) Carbon(Nov. 2010), pp. 1151-1158.

Liu et al>, "Synthesis of nano onion-like fullerenes by using Fe/Al2O3 as catalysts by chemical vapor deposition", 54 (1.1) Chinese Sci Bull.(Jan. 2009), pp. 137-141.

Yang et al., "Synthesis of nano onion-like fullerenes by chemical vapor deposition using an iron catalysts supported on sodium chloride", 13(5) J. Nanoparticle Res. (May 12, 2010), pp. 1979-1986.

Zhu Jianguo et al., Electronics and Optoelectronics Materials, National Defense Industry Press, 2007, pp. 277-278 (with English Translation).

\* cited by examiner

PROCESS OF CONTROLLING THE MORPHOLOGY OF GRAPHITE

CROSS-REFERENCE TO RELATED APPLICATIONS

This application is a continuation of U.S. patent application Ser. No. 15/754,790, filed on Feb. 23, 2018, which is a U.S. national stage application under 35 U.S.C. § 371 of PCT Application No. PCT/AU2016/000298, filed Aug. 26, 2016, which claims the benefit of Australian Patent Application No. 2015903458, filed Aug. 26, 2015. The disclosures of the aforementioned priority applications are incorporated herein by reference in their entireties.

FIELD OF THE INVENTION

The present invention relates to a process of controlling the morphology of graphite in a process for the production of graphite.

BACKGROUND ART

Solid carbon, or more particularly graphite, is considered a key material in the emerging green technology market. It has been shown to be useful in energy storage, electric vehicles, photovoltaics and modern electronics equipment. As different morphologies of graphite exhibiting different properties, commercial uses of graphite are also highly dependent on the morphology.

Natural gas can be catalytically cracked into both solid carbon and hydrogen gas according to Equation (1).

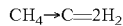

$$CH_4 \rightarrow C + 2H_2$$

$$\Delta H_{cracking,298K} = 74.81 \text{ kJ/mol}, \Delta G_{cracking,298K} = 50.72 \text{ kJ/mol} \qquad (1)$$

In such a process, the solid carbon material deposits onto the surface of the catalyst and hydrogen gas evolves. There are a wide number of known catalysts for the process, including precious metals, transition metals and carbon-based catalysts.

Whilst the above process is known, it has not been exploited commercially for a number of economic reasons, primarily relating to the underlying catalyst costs, both in the initial supply, as well as costs in recycling and regenerating the catalyst. The particular catalyst used also heavily impacts the morphology of the solid carbon produced, while offering very little means of control whatsoever.

There is a significant need for new and improved processes and catalysts for the catalytic conversion of hydrocarbons to hydrogen and a solid carbon which are stable and commercially valuable, whilst allowing for the morphology of the produced carbon to be controlled.

The preceding discussion of the background art is intended to facilitate an understanding of the present invention only. It should be appreciated that the discussion is not an acknowledgement or admission that any of the material referred to was part of the common general knowledge in Australia as at the priority date of the application.

SUMMARY OF THE INVENTION

In accordance with the present invention, there is provided a process of controlling the morphology of graphite in a process for the production of graphite, the process comprising: contacting at elevated temperature, a metal-containing catalyst with a hydrocarbon gas to catalytically convert at least a portion of the hydrocarbon gas to hydrogen and carbon; wherein the temperature is between 600° C. and 1000° C. and a pressure between 0 bar(g) and 100 bar(g), and wherein both the temperature and the pressure are set within predetermined value ranges to selectively synthesize graphitic material with a desired morphology.

Throughout this specification, unless the context requires otherwise, the term "selectively synthesize" will be understood refer to the preferential synthesis of one morphology over the others. Whilst the process of the present invention will often produce a mixture of morphologies, the Applicant has determined that the selection of the temperature and pressure of the process has an effect on the morphology of the graphite so produced.

Throughout this specification, unless the context requires otherwise, it will be appreciated that the process of the present invention can be conducted at more than one temperature and/or pressure within a specified range. For example, if a temperature range of 600° C. to 800° C. is provided, the step of contacting the metal-containing catalyst with a hydrocarbon gas could initially be performed at 600° C., with the temperature being increased to 800° C. during the contact of the metal-containing catalyst with a hydrocarbon gas. Similarly, if a pressure range of 0 bar(g) to 8 bar(g) is provided, the step of contacting the metal-containing catalyst with a hydrocarbon gas could initially be performed at 0 bar(g), with the pressure being increased to 8 bar(g) during the contact of the metal-containing catalyst with a hydrocarbon gas.

Throughout this specification, unless the context requires otherwise, the term "selectivity" refers to the percentage of the produced graphitic material with the desired morphology.

Throughout this specification, unless the context requires otherwise, the term "bar(g)" refers to gauge pressure. As would be understood by the skilled addressee, gauge pressure refers to pressure in bars above ambient pressure.

As used in this specification, the term "predetermined value ranges" refers to a particular range of pressures and temperatures that may be selected by the skilled person to selectively synthesize graphitic material with a desired morphology. The person skilled in the art would be able to select an appropriate temperature or temperatures and pressure or pressure within these ranges to selectively synthesize the desired graphitic material.

In one form of the present invention, the metal-containing catalyst is a synthetic metal-containing catalyst. Throughout this specification, unless the context requires otherwise, the term "synthetic" will be understood to imply that the material has been synthesized through chemical techniques. Synthetic metal-containing catalysts are typically of high purity.

In one form of the present invention, the synthetic metal-containing catalyst is a synthetic iron oxide-containing material. In one form of the present invention, the iron oxide is synthetic metal-containing catalyst is Fe2O3 or Fe3O4.

In an alternative form of the present invention, the metal-containing catalyst is non-synthetic. Throughout this specification, unless the context requires otherwise, the term "non-synthetic" will be understood to imply that the material has not been synthesized through chemical techniques. Whilst the term "non-synthetic" does include naturally occurring materials, it should not be understood to exclude materials that have gone through physical beneficiation such as crushing and screening or classification.

In one form of the present invention, the metal-containing catalyst is a nonsynthetic iron oxide-containing material. In one form of the present invention, the metal-containing catalyst is a non-synthetic iron oxide-containing ore. In one form of the present invention, the non-synthetic iron oxide-containing ore is iron ore. The iron ore may be hematite iron ore or goethite iron ore.

In one form of the present invention, the metal-containing catalyst may undergo a pre-treatment step to increase its catalytic effect. Pre-treatment steps include pre-reduction at high temperatures. Advantageously, the inventors have discovered that the elevated temperatures of present invention may obviate such a pre-treatment step.

As would be understood by a person skilled in the art, graphitic material can exist in many forms, such as: graphitic fibers, which are fibrous carbon structures typically ranging from 100 nm to 100 microns in length, carbon nano-tubes (CNTs), which are cylindrical nanostructures comprising single or multiple graphitic sheets aligned concentrically or perpendicular to a central axis also fall within the scope of graphitic fibers; carbon nano-onions (CNOs), which are structures that consist of multiple spherical graphitic sheets that are concentrically layered from a central core, which is typically a catalyst particle or a void. These carbon structures typically range from 50-500 nm in diameter; carbon micro-spheres (CMSs), which are hollow globular graphitic structures typically greater than 500 nm in size. They are globular in shape and can be chain-like. The synthetic form of this graphite morphology is novel, having only been found naturally occurring in meteorites; and graphene, which is single-layer or single-digit layer sheets of graphite.

In a preferred form of the present invention, the desired morphology is selected from the group comprising graphite fibers, carbon nano-onions (CNOs), carbon microshells (CMSs) and graphene. More preferably, the graphite fibers comprise a mixture of carbon nanotubes (CNTs) and other graphitic fibers.

In one form of the present invention, CNOs are selectively synthesized where the step of: contacting at elevated temperatures a metal-containing catalyst with a hydrocarbon gas to catalytically convert at least a portion of the hydrocarbon gas to hydrogen and carbon, is conducted at a temperature between 700° C. to 900° C. and a pressure between 0 bar(g) to 8 bar(g).

In one form of the present invention, the temperature is 800° C. to 900° C. and the pressure is 2 bar(g) to 4 bar(g). In an alternative form of the present invention, the temperature is 800° C. and the pressure is 2 bar(g). In an alternative form of the present invention, the temperature is 850° C. and the pressure is 2 bar(g). In an alternative form of the present invention, the temperature is 900° C. and the pressure is 2 bar(g). In an alternative form of the present invention, the temperature is 750° C. and the pressure is 8 bar(g). In an alternative form of the present invention, the temperature is 800° C. and the pressure is 8 bar(g).

Preferably, the metal-containing catalyst is hematite iron oxide or goethite iron oxide.

In one form of the present invention, CNO is at least 60% of the graphitic material. Preferably, CNO is at least about 70%, at least about 80%, or at least about 90% of the graphitic material.

In one form of the present invention, graphitic fibers are selectively synthesized where the step of: contacting at elevated temperatures a metal-containing catalyst with a hydrocarbon gas to catalytically convert at least a portion of the hydrocarbon gas to hydrogen and carbon, is conducted at a temperature of 700° C. to 900° C. and a pressure between 0 bar(g) to 8 bar(g) and the metal-containing catalyst is goethite iron oxide.

Preferably, the temperature is 750° C. to 850° C. and the pressure is 0 bar(g) to 4 bar(g). More preferably, the temperature is 800° C. and the pressure is 0 bar(g).

In one form of the present invention, the metal-containing catalyst is an iron ore.

In one form of the present invention, the iron ore is goethite ore.

In one form of the present invention, graphitic fibers are at least 50% of the graphitic material. Preferably, graphitic fibers are at least about 70%, at least about 80%, or at least about 90% of the graphitic material.

In one form of the present invention, CMS is selectively synthesized where the step of: contacting at elevated temperatures a metal-containing catalyst with a hydrocarbon gas to catalytically convert at least a portion of the hydrocarbon gas to hydrogen and carbon, is conducted at a temperature of 800° C. to 900° C. and a pressure between 4 bar(g) to 9 bar(g).

Preferably, the temperature is 850° C. to 900° C. and the pressure is 6 bar(g) to 8 bar(g). In an alternative form of the present invention, the temperature is 900° C. and the pressure is 8 bar(g). In a further alternative form of the present invention, the temperature is 850° C. and the pressure is 6 bar(g). More preferably, the temperature is 900° C. and the pressure is 6 bar(g). In a further alternative form of the present invention, the temperature is 850° C. and the pressure is 7 bar(g). In a further alternative form of the present invention, the temperature is 900° C. and the pressure is 7 bar(g). In a further alternative form of the present invention, the temperature is 850° C. and the pressure is 8 bar(g). In a further alternative form of the present invention, the temperature is 900° C. and the pressure is 4 bar(g). In a further alternative form of the present invention, the temperature is 900° C. and the pressure is 8 bar(g).

In one form of the present invention, CMS is at least 60% of the graphitic material. Preferably, CMS is at least about 70%, at least about 80%, or at least about 90% of the of the graphitic material.

In one form of the present invention, graphene is selectively synthesized where the step of: contacting at elevated temperatures a metal-containing catalyst with a hydrocarbon gas to catalytically convert at least a portion of the hydrocarbon gas to hydrogen and carbon, is conducted at a temperature of 600° C. to 750° C. and pressure is 0 bar(g) to 1 bar(g).

Preferably, the temperature is 600° C. to 700° C. and the pressure is 0 bar(g). More preferably, the temperature is 650° C. and the pressure is 0 bar(g).

In one form of the present invention, graphene is at least 60% of the graphitic material. Preferably, graphene is at least about 70%, at least about 80%, or at least about 90% of the graphitic material.

In accordance with a further aspect of the present invention, there is provided a process for the synthesis of CNOs, the process comprising: contacting at elevated temperatures a metal-containing catalyst with a hydrocarbon gas to catalytically convert at least a portion of the hydrocarbon gas to hydrogen and carbon, wherein the temperature is 700° C. to 900° C. and a pressure between 0 bar(g) to 8 bar(g).

In one embodiment, the temperature is 800° C. to 900° C. and the pressure is 2 bar(g) to 4 bar(g). In one embodiment, the temperature is 800° C. and the pressure is 2 bar(g). In one embodiment, the temperature is 850° C. and the pressure is 2 bar(g). In one embodiment, the temperature is 900° C. and the pressure is 2 bar(g). In one embodiment, the temperature is 750° C. and the pressure is 8 bar(g). In one embodiment, the temperature is 800° C. and the pressure is 8 bar(g).

Preferably, the metal-containing catalyst is Fe$_2$O$_3$ or hematite iron ore. More preferably, the metal-containing catalyst is Fe$_2$O$_3$.

In accordance with a further aspect of the present invention, there is provided a process for the synthesis of graphitic fibers, the process comprising: contacting at elevated temperatures a metal-containing catalyst with a hydrocarbon gas to catalytically convert at least a portion of the hydrocarbon gas to hydrogen and carbon, wherein the temperature is 700° C. to 900° C. and a pressure between 0 bar(g) to 8 bar(g) and the metal-containing catalyst is Fe$_3$O$_4$ or goethite iron ore.

Preferably, the temperature is 750° C. to 850° C. and the pressure is 0 bar(g) to 4 bar(g). More preferably, the temperature is 800° C. and the pressure is 0 bar(g).

Preferably, the metal-containing catalyst is goethite iron ore.

In accordance with a further aspect of the present invention, there is provided a process for selectively synthesizing CMS, the process comprising: contacting at elevated temperatures a metal-containing catalyst with a hydrocarbon gas to catalytically convert at least a portion of the hydrocarbon gas to hydrogen and carbon, wherein the temperature is 800° C. to 900° C. and the pressure is between 4 bar(g) to 9 bar(g).

Preferably, the temperature is 850° C. to 900° C. and the pressure is 6 bar(g) to 8 bar(g). More preferably, the temperature is 900° C. and the pressure is 8 bar(g). More preferably, the temperature is 850° C. and the pressure is 6 bar(g). More preferably, the temperature is 900° C. and the pressure is 6 bar(g). In one embodiment, the temperature is 850° C. and the pressure is 7 bar(g). In one embodiment, the temperature is 900° C. and the pressure is 7 bar(g). In one embodiment, the temperature is 850° C. and the pressure is 8 bar(g). More preferably, the temperature is 900° C. and the pressure is 4 bar(g). More preferably, the temperature is 900° C. and the pressure is 8 bar(g).

Preferably, the metal-containing catalyst is Fe$_2$O$_3$ or hematite iron ore. More preferably, the metal-containing catalyst is Fe$_2$O$_3$.

In accordance with a further aspect of the present invention, there is provided a process for the synthesis of graphene, the process comprising: contacting at elevated temperatures a metal-containing catalyst with a hydrocarbon gas to catalytically convert at least a portion of the hydrocarbon gas to hydrogen and carbon, wherein the temperature is 600° C. to 750° C. and the pressure is between 0 bar(g) to 1 bar(g).

Preferably, the temperature is 600° C. to 700° C. and the pressure is 0 bar(g). More preferably, the temperature is 650° C. and the pressure is 0 bar(g).

Preferably, the metal-containing catalyst is Fe$_2$O$_3$ or hematite iron ore. More preferably, the metal-containing catalyst is Fe$_2$O$_3$.

In accordance with the present invention, there is provided a process of controlling the morphology of graphite in a process for the production of graphite, the process comprising: contacting at elevated temperatures a metal-containing catalyst with a hydrocarbon gas to catalytically convert at least a portion of the hydrocarbon gas to hydrogen and carbon; wherein the temperature is between 600° C. and 1000° C. and a pressure between 0 bar(g) and 100 bar(g), and wherein both the temperature and the pressure are set within predetermined value ranges to selectively synthesize graphitic material with a desired morphology, wherein: CNOs are selectively synthesized where the step of: contacting at elevated temperatures a metal-containing catalyst with a hydrocarbon gas to catalytically convert at least a portion of the hydrocarbon gas to hydrogen and carbon, is conducted at a temperature between 700° C. to 900° C. and a pressure between 0 bar(g) to 8 bar(g); graphitic fibers are selectively synthesized where the step of: contacting at elevated temperatures a metal-containing catalyst with a hydrocarbon gas to catalytically convert at least a portion of the hydrocarbon gas to hydrogen and carbon, is conducted at a temperature of 700° C. to 900° C. and a pressure between 0 bar(g) to 8 bar(g) and the metal-containing catalyst is goethite iron oxide; CMSs is selectively synthesized where the step of: contacting at elevated temperatures a metal-containing catalyst with a hydrocarbon gas to catalytically convert at least a portion of the hydrocarbon gas to hydrogen and carbon, is conducted at a temperature of 800° C. to 900° C. and a pressure between 4 bar(g) to 9 bar(g); graphene is selectively synthesized where the step of: contacting at elevated temperatures a metal-containing catalyst with a hydrocarbon gas to catalytically convert at least a portion of the hydrocarbon gas to hydrogen and carbon, is conducted at a temperature of 600° C. to 750° C. and pressure is 0 bar(g) to 1 bar(g).

In one form of the invention the pressure range is selected from any one of about 1 bar(g) to about 10 bar(g); about 2 bar(g) to about 10 bar(g); about 3 bar(g) to about 10 bar(g); about 4 bar(g) to about 0 bar(g); about 5 bar(g) to about 10 bar(g); about 6 bar(g) to about 10 bar(g); about 7 bar(g) to about 10 bar(g); about 8 bar(g) to about 10 bar(g); and about 9 bar(g) to about 10 bar(g). In a further form of the invention the pressure range is selected from any one of at least about 0 bar(g); about 1 bar(g); about 2 bar(g); about 3 bar(g); about 4 bar(g); about 5 bar(g); about 6 bar(g); about 7 bar(g); about 8 bar(g); about 9 bar(g); and at least about 10 bar(g). In a further form of the invention, the pressure range is greater than about 10 bar (g) and less than about 100 bar (g).

In one form of the invention the temperature is selected from any one of between 650° C. and 1000° C.; 700° C. and 1000° C.; 750° C. and 1000° C.; 800° C. and 1000° C.; 850° C. and 1000° C.; 900° C. and 1000° C.; and 950° C. and 1000° C. In a further form of the invention, the temperature is selected from any one of between 650° C. and 900° C.; 700° C. to 900° C.; and 800° C. to 900° C. In a further form of the invention, the temperature is selected from any one of between 650° C. to 750° C.; 750° C. to 850° C.; and 850° C. to 900° C. In a further form of the invention the temperature is selected from any one of 600° C.; 650° C.; 700° C.; 750° C.; 800° C.; 850° C.; 900° C.; 950° C.; and 1000° C.

The process of the present invention provides selective synthesis of a graphitic material with a desired morphology. It is understood by the inventors that the selectivity of the process for the desired graphitic material may be achieved by alteration of the predetermined value ranges of pressure and temperature and the particular metal-containing catalyst used. In one form of the invention, the selectivity of the graphitic material with the desired morphology is at least 40%. Preferably, the selectivity is at least 45%. More preferably, the selectivity is at least 50%. Still preferably, the selectivity is at least 55%. Still preferably, the selectivity is at least 60%. Still preferably, the selectivity is at least 65%. Still preferably, the selectivity is at least 70%. Still preferably, the selectivity is at least 75%. Still preferably, the selectivity is at least 80%. Still preferably, the selectivity is at least 85%. Still preferably, the selectivity is at least 90%.

In a preferred form of the present invention, the metal-containing catalyst is a metal oxide catalyst. As would be understood by a person skilled in the art, a metal oxide is a metal-containing compound which contains an anion of oxygen. In one form of the invention, the metal-containing catalyst is an iron oxide catalyst. Preferably, the iron oxide catalyst is selected from $Fe_2O_3$; $Fe_3O_4$; or any mixture thereof.

In one form of the present invention, the metal-containing catalyst is nonsynthetic. Throughout this specification, unless the context requires otherwise, the term "non-synthetic" will be understood to imply that the material has not been synthesized through chemical techniques. Whilst the term "non-synthetic" does include naturally occurring materials, it should not be understood to exclude materials that have gone through physical beneficiation such as crushing and screening or classification.

In one form of the present invention, the metal-containing catalyst is a nonsynthetic iron oxide-containing material. Preferably, the metal-containing catalyst is a non-synthetic iron oxide-containing ore. In a preferred form of the present invention, the non-synthetic iron oxide-containing ore is iron ore. In one form, the iron ore is one of hematite iron ore and goethite iron ore.

Without wishing to be bound by theory, it is understood by the inventors that the mean particle size of the metal-containing catalyst may impact the selectivity and the yield of the graphitic material. In one form of the invention, the metal-containing catalyst has an average particle size of less than any one of 3 cm; 2.5 cm; 2 cm; 1.5 cm; 1 cm; 9 mm; 8 mm; 7 mm; 6 mm; 5 mm; 4 mm; 3 mm; 2 mm; 1 mm; 750 µm; 500 µm; 250 µm; 200 µm; 150 µm; 100 µm; 50 µm; 25 µm; 20 µm; 15 µm; 10 µm; 5 µm; and 1 µm.

In one form of the present invention, the metal-containing catalyst undergoes a size reduction step to obtain the desired mean particle size. Preferably, the size reduction step one or more of milling, grinding, sieving, and other such equivalent processes.

Without wishing to be bound by theory, it is understood by the inventors that the yield of the total graphitic material may depend on the predetermined value ranges of pressure and temperature, and the metal-containing catalyst used. In one form of the present invention, the yield of the graphitic material is at least 4 grams per gram of elemental iron in the metal-containing catalyst. In a further form of the present invention, the yield of the graphitic material is at least 5 grams per gram of elemental iron in the metal-containing catalyst. In a further form of the present invention, the yield of the graphitic material is at least 6 grams per gram of elemental iron in the metal-containing catalyst. In a further form of the present invention, the yield of the graphitic material is at least 7 grams per gram of elemental iron in the metal-containing catalyst. In a further form of the present invention, the yield of the graphitic material is at least 8 grams per gram of elemental iron in the metal-containing catalyst. In a further form of the present invention, the yield of the graphitic material is at least 9 grams per gram of elemental iron in the metal-containing catalyst. In a further form of the present invention, the yield of the graphitic material is at least 10 grams per gram of elemental iron in the metal-containing catalyst. In a further form of the present invention, the yield of the graphitic material is at least 11 grams per gram of elemental iron in the metal-containing catalyst. In a further form of the present invention, the yield of the graphitic material is at least 12 grams per gram of elemental iron in the metal-containing catalyst. In a further form of the present invention, the yield of the graphitic material is at least 13 grams per gram of elemental iron in the metal-containing catalyst. In a further form of the present invention, the yield of the graphitic material is at least 14 grams per gram of elemental iron in the metal-containing catalyst. In a further form of the present invention, the yield of the graphitic material is at least 15 grams per gram of elemental iron in the metal-containing catalyst. In a further form of the present invention, the yield of the graphitic material is at least 16 grams per gram of elemental iron in the metal-containing catalyst. In a further form of the present invention, the yield of the graphitic material is at least 17 grams per gram of elemental iron in the metal-containing catalyst. In a further form of the present invention, the yield of the graphitic material is at least 18 grams per gram of elemental iron in the metal-containing catalyst. In a further form of the present invention, the yield of the graphitic material is at least 19 grams per gram of elemental iron in the metal-containing catalyst. In a further form of the present invention, the yield of the graphitic material is at least 20 grams per gram of elemental iron in the metal-containing catalyst.

In one form of the present invention, the yield of the graphitic material is between 4 and 20 grams per gram of elemental iron in the metal-containing catalyst. In a further form of the present invention, the yield of the graphitic material is between 6 and 20 grams per gram of elemental iron in the metal-containing catalyst. In a further form of the present invention, the yield of the graphitic material is between 8 and 20 grams per gram of elemental iron in the metal-containing catalyst. In a further form of the present invention, the yield of the graphitic material is between 10 and 20 grams per gram of elemental iron in the metal-containing catalyst. In a further form of the present invention, the yield of the graphitic material is between 12 and 20 grams per gram of elemental iron in the metal-containing catalyst. In a further form of the present invention, the yield of the graphitic material is between 14 and 20 grams per gram of elemental iron in the metal-containing catalyst. In a further form of the present invention, the yield of the graphitic material is between 16 and 20 grams per gram of elemental iron in the metal-containing catalyst. In a further form of the present invention, the yield of the graphitic material is between 18 and 20 grams per gram of elemental iron in the metal-containing catalyst.

Without wishing to be bound by theory, it is understood by the inventors that the yield of the total graphitic material may depend on the duration of the reaction. As would be understood by a person skilled in the art, the selected temperature and pressure impacts the duration of the reaction. In one form of the invention, the duration of the reaction is selected from any one of at least 5 minutes; 10 minutes; 15 minutes; 20 minutes; 25 minutes; 30 minutes; 35 minutes; 40 minutes; 45 minutes; 50 minutes; or 55 minutes; 1 hour; 2 hours, 4 hours; 6 hours; 8 hours; 10 hours; 12 hours; 14 hours; 16 hours; 18 hours; 20 hours; 22 hours; 24 hours; 26 hours; 28 hours; 30 hours; 32 hours; 44 hours; 36 hours; 38 hours; 40 hours; 42 hours; 44 hours; 46 hours; and 48 hours. In a further form of the invention, the duration of the reaction is selected from any one of between 2 and 48 hours; 2 and 44 hours; 2 and 38 hours; 2 and 34 hours; 2 and 30 hours; 2 and 26 hours; 2 and 22 hours; 2 and 18 hours; 2 and 14 hours; 2 and 10 hours; 2 and 8 hours; and 2 and 4 hours.

In one form of the present invention, the metal-containing catalyst is unsupported. In the context of the present invention and as understood by those skilled in the art, unsupported catalysts are catalysts which are not attached or bonded to a catalyst support, which is the material to which the catalyst is affixed. Catalyst supports are typically a solid material with a high surface area and are used to increase the available surface area of a catalyst to increase the yield of graphitic material. Catalysts may also be supported in their natural state, that is, the surface of the metal-containing catalyst is coated/bonded with the active species and is supported by the core which may be different material to the metal-containing catalyst coating or the same material as the metal-containing catalyst coating.

In an alternative form of the invention, the metal-containing catalyst is a supported catalyst. As would be understood by a person skilled in the art, the supported catalyst comprises the catalyst and a support. In one form of the present invention, the support is of a different chemical composition to the metal-containing catalyst. In an alternative form of the present invention, the support is of the same chemical composition as the metal-containing catalyst.

In one form of the present invention, the hydrocarbon gas is methane. In an alternative form of the present invention, the hydrocarbon gas is natural gas.

In one form of the present invention, the step of: contacting at elevated temperatures a metal-containing catalyst with a hydrocarbon gas to catalytically convert at least a portion of the hydrocarbon gas to hydrogen and carbon, is performed in a reactor maintained within the temperature ranges and pressure ranges.

BRIEF DESCRIPTION OF THE FIGURES

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings, by way of example only, in which.

DETAILED DESCRIPTION OF THE PREFERRED EMBODIMENTS OF THE INVENTION

Figure 1:
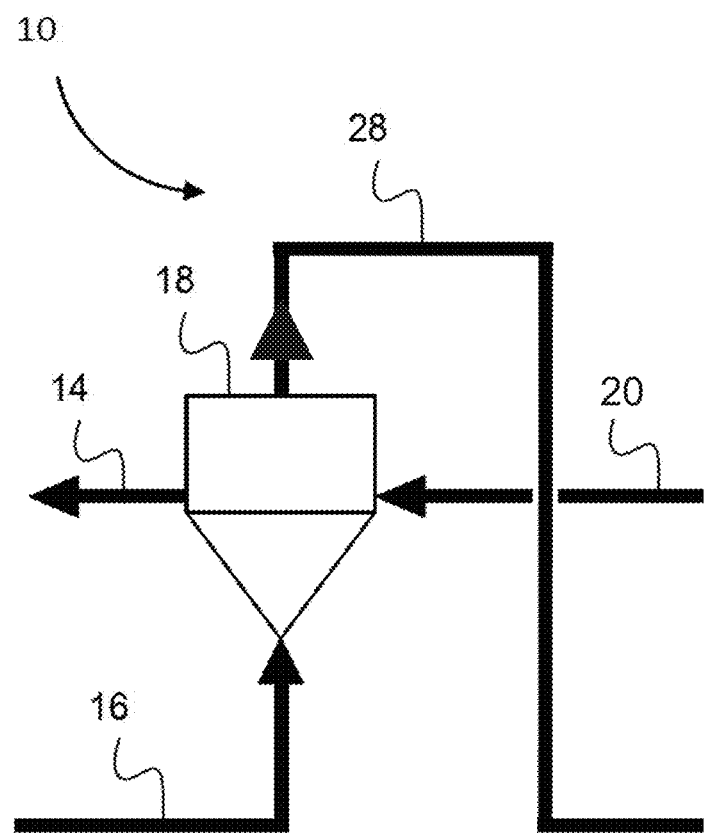
FIG. 1 shows a schematic representation of the process for producing hydrogen and carbon in accordance with a first aspect of the present invention.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

Each document, reference, patent application or patent cited in this text is expressly incorporated herein in their entirety by reference, which means that it should be read and considered by the reader as part of this text. That the document, reference, patent application or patent cited in this text is not repeated in this text is merely for reasons of conciseness. None of the cited material or the information contained in that material should, however be understood to be common general knowledge.

Manufacturer's instructions, descriptions, product specifications, and product sheets for any products mentioned herein or in any document incorporated by reference herein, are hereby incorporated herein by reference, and may be employed in the practice of the invention.

The present invention is not to be limited in scope by any of the specific embodiments described herein. These embodiments are intended for the purpose of exemplification only. Functionally equivalent products, formulations and methods are clearly within the scope of the invention as described herein.

The invention described herein may include one or more range of values (e.g. size, concentration etc.). A range of values will be understood to include all values within the range, including the values defining the range, and values adjacent to the range which lead to the same or substantially the same outcome as the values immediately adjacent to that value which defines the boundary to the range.

Throughout this specification, unless the context requires otherwise, the word "comprise" or variations such as "comprises" or "comprising", will be understood to imply the inclusion of a stated integer or group of integers but not the exclusion of any other integer or group of integers.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Features of the invention will now be discussed with reference to the following non-limiting description and examples.

In a general form, the present invention relates to a process for producing hydrogen and solid carbon. In particular, the present invention relates to a process of controlling the morphology of graphite in a process for the production of graphite.

The process of controlling the morphology of graphite in a process for the production of graphite, the process comprising: contacting a metal-containing catalyst with a hydrocarbon gas at elevated temperature to catalytically convert at least a portion of the hydrocarbon gas to hydrogen and carbon; wherein the temperature is between 600° C. and 1000° C. and the pressure is between 0 bar(g) and 100 bar(g) and wherein both the temperature and pressure are set to predetermined values to selectively synthesize a desired morphology.

The hydrocarbon gas may be any gas stream that comprises light hydrocarbons. Illustrative examples of hydrocarbon gas include, but are not limited to, natural gas, coal seam gas, landfill gas and biogas. The composition of the hydrocarbon gas may vary significantly but it will generally comprise one or more light hydrocarbons from a group comprising methane, ethane, ethylene, propane and butane.

In a preferred embodiment of the invention, the hydrocarbon gas comprises substantially methane.

The metal-containing catalyst may be selected from a group comprising iron oxide-containing compounds such as hematite iron oxide and goethite iron oxide.

The metal-containing catalyst is disposed in a reactor in a manner such that the metal-containing catalyst can contact the hydrocarbon gas. For example, the metal-containing catalyst can be disposed on a substantially horizontal surface of the reactor and subjected to a transverse flow of hydrocarbon gas.

Alternatively, the metal-containing catalyst can be suspended in a fluidized bed reactor which is subjected to a longitudinal flow of hydrocarbon gas.

Referring to FIG. 1, a process 10 for producing hydrogen 12 and carbon 14 from a hydrocarbon gas, for example, natural gas 16 is described.

In the embodiment shown in FIG. 1, the process in undertaken in a reactor 18 loaded with a metal-containing catalyst, for example iron oxide 20. The iron oxide 20 is crushed to <150 μm prior to being loaded into the reactor 18.

It is understood that the amount of catalyst loaded into the reactor is relative to the quantity of carbon yield, which is dependent on the deactivation rate (by carbon encapsulation). It is understood by the Applicant that the deactivation rate varies depending on the morphology of the carbon produced.

Natural gas 16 is directed into the reactor 18 which is at an elevated temperature and pressure where it contacts the iron oxide 20 to produce hydrogen gas 12 and carbon 14. The process deposits carbon 14 onto the metal-containing catalyst 20. A portion of the natural gas 16 remains unreacted and mixes with the produced hydrogen gas 12 to form a first gas stream 28.

The process of the present invention allows for the selective synthesis of graphitic fibers, preferably in the form of carbon nanotubes (CNTs), carbon nano-onions (CNOs), carbon micro-shells (CMSs) and graphene.

The morphology of the produced carbon 14 is determined by the temperature and pressure of the process.

Without wishing to be bound by theory, it is understood by the applicant that higher carbon deposition rates tend to produce more types of enveloping graphite such as CNO and CMS as opposed to graphitic fibers, which require lower and more stable deposition rates. It is understood that the carbon deposition rate is influenced by the reaction conditions, in particular reaction temperatures and pressures. Higher reaction temperatures increase the reaction rate by increasing the reaction kinetics and thermodynamics. Pressures also increase the reaction rate for encapsulating types of carbon because the reaction becomes diffusion limited as the graphite creates a barrier between the reactant gas and the metal-containing catalyst.

As the reaction occurs the reactant gas reduces the iron oxide catalyst particles into elemental iron, and emits small amounts of water vapor, CO and $CO_2$ as a byproduct. After reduction, the reactant gas continues to decompose on the surface of the reduced iron oxide particles, producing hydrogen gas and surface carbon. This carbon diffuses into the surface of the particle until the particle saturates and forms a metal carbide, for example iron carbide ($Fe_3C$) when an iron oxide catalyst is used. This carbide is metastable at temperatures beyond 680° C. and readily decomposes back to ferrite and carbon, where the carbon is precipitated as graphite. The reaction is able to continue so long as the reactant gas is able to contact the surface of the metal-containing catalyst particle. This cycle, termed the 'carbide cycle', continues until the reactant gas is unable to diffuse through the enveloping graphite to contact the metal-containing catalyst.

Polycrystalline iron oxide particles are able to produce graphite morphologies many times smaller than their physical particle size because of a phenomenon called metal dusting. Metal dusting is an industry term used to describe a reaction that disintegrates metallic material (often ferrous) into fragments and graphite within a carburizing environment. This effect begins by methane molecules (or other carbonaceous gases) adsorbing and dissociating on the surface of the metal-containing catalyst and the resulting carbon diffusing into the surface of the bulk metal. Once this outer layer is saturated with carbon, it forms metal carbide and then precipitates from the metallic grain boundaries as graphitic carbon. Over time this causes inter-granular pressure that separates the metal carbide particles from the parent bulk metal, and causes the metal structure to disintegrate by 'dusting'.

As would be understood by a person skilled in the art, different metal-containing materials have different sized polycrystalline metal particles. Once the polycrystalline metals particles are greater than a threshold size, it is understood that the reaction is initially contained to the periphery of the metal-containing catalyst particle and forms a graphite 'skin' on the surface of the particle. When the reaction conditions have low kinetic energy (atmospheric pressure and <750° C. respectively) this graphite skin sufficiently retards the reaction rate by restricting the reactant gas from contacting the metal-containing catalyst surface. This slower rate allows the carbon to diffuse into the bulk of the metal-containing catalyst particle and results in the dusting of the metal-containing catalyst particle, and the exfoliation of the graphite skin as multi-layered graphene.

Figure 2:
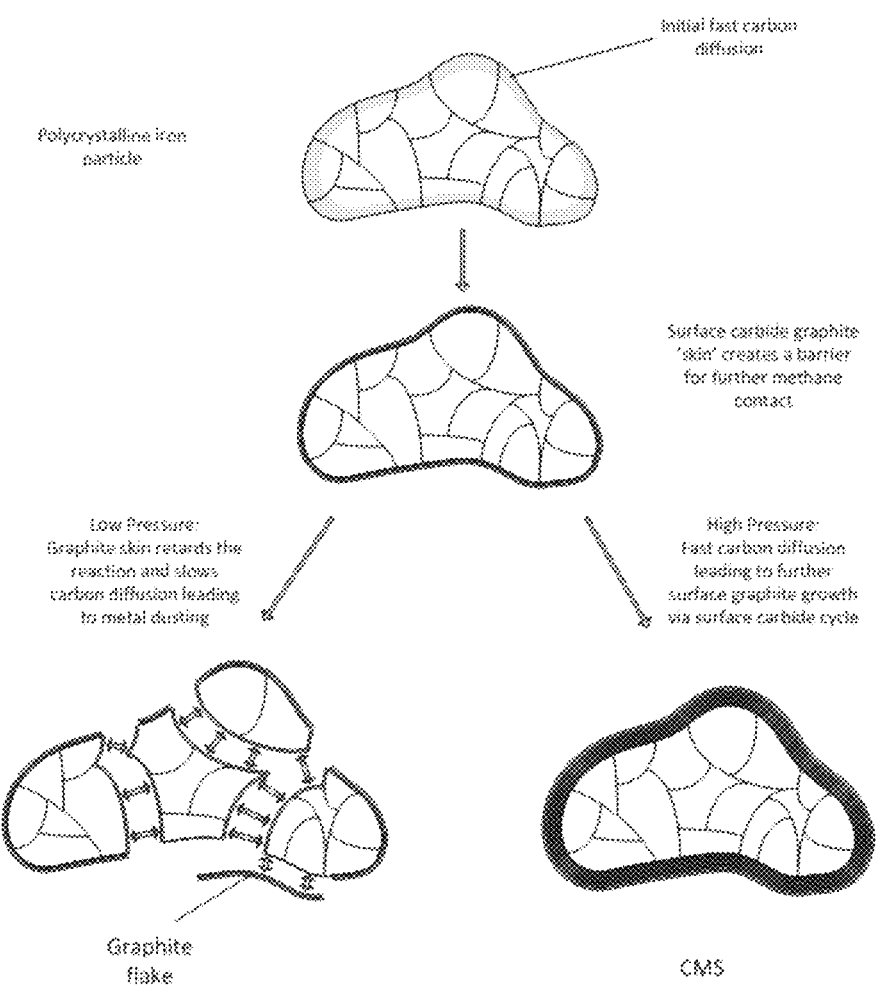
FIG. 2 shows a schematic for the growth mechanism of multi-layer graphene and CMS.
Figure 3:
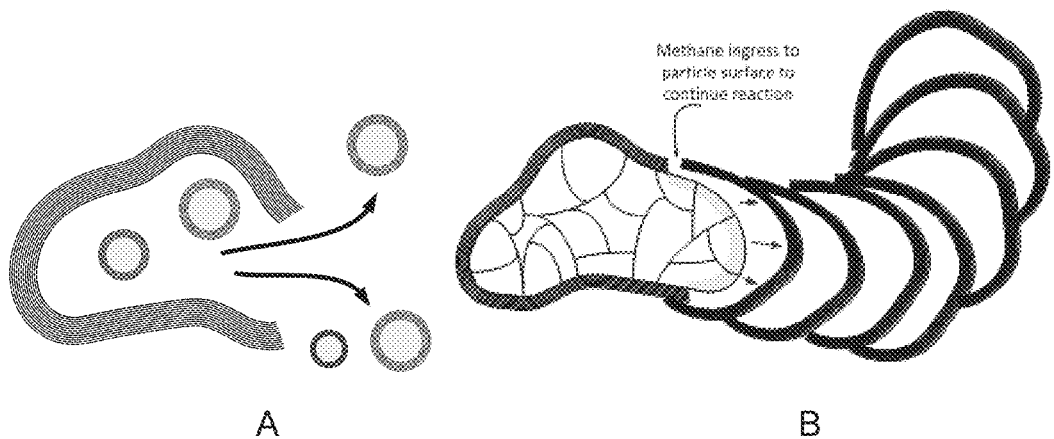
FIGS. 3a and 3b shows a schematic for the differences between the hollow spherical shell formation and the agglomerated hollow chain-like structures of the present invention.

At higher carbon deposition rates (at reaction pressures of >3 bar absolute and temperatures of >800° C.) it is believed that the surface graphite does not inhibit the carbide cycle reaction and the fast reaction rate does not allow sufficient time for the carbon to diffuse into the bulk of the metal-containing catalyst particle. The graphite continues to grow on the surface of the metal-containing catalyst particle until rupture, leaving a CMS type structure. This rupture results in the metal-containing catalyst particle dusting and being expelled from the CMS structure, leaving a hollow spherical shell. Alternatively, the growth can involve a cyclic process of graphite growth and rupture, with each ruptured section adhering to the previous section resulting in agglomerated hollow chain-like structures. A schematic for the growth mechanism of multi-layer graphene and CMS as understood by the Applicant is shown in FIG. 2. The differences between the hollow spherical shell formation and the agglomerated hollow chain-like structures are shown in FIGS. 3a and 3b.

It is understood by the Applicant that CNOs and graphitic fibers are produced once the polycrystalline metal particles have dusted. The size of the dusted particles depends on the crystalline particle size of the metal-containing material. Those with lower crystalline particle sizes produce more graphitic fibers, whereas larger particles produce more CNOs. Goethite ores for example contain smaller crystalline particle sizes than for example, hematite ores and therefore tend to produce a higher proportion of graphitic fibers.

It is understood by the Applicant that impurities in the hydrocarbon gas and/or the metal-containing catalyst can affect the morphologies produced. It is expected that impurities in the hydrocarbon gas will alter the reaction kinetics and impact on the growth rate of the carbon. impurities in the metal-containing catalyst can be expected to affect the characteristics of the produced morphologies by disrupting the progress of the above discussed growth mechanisms.

The process of the present invention has been used to produce a range of graphitic carbon morphologies, including carbon nano-onions (CNO), carbon nanotubes (CNT), carbon micro-shells (CMS) and graphene.

The invention is described by way of the following non-limiting examples.

EXPERIMENTAL

Figure 4:
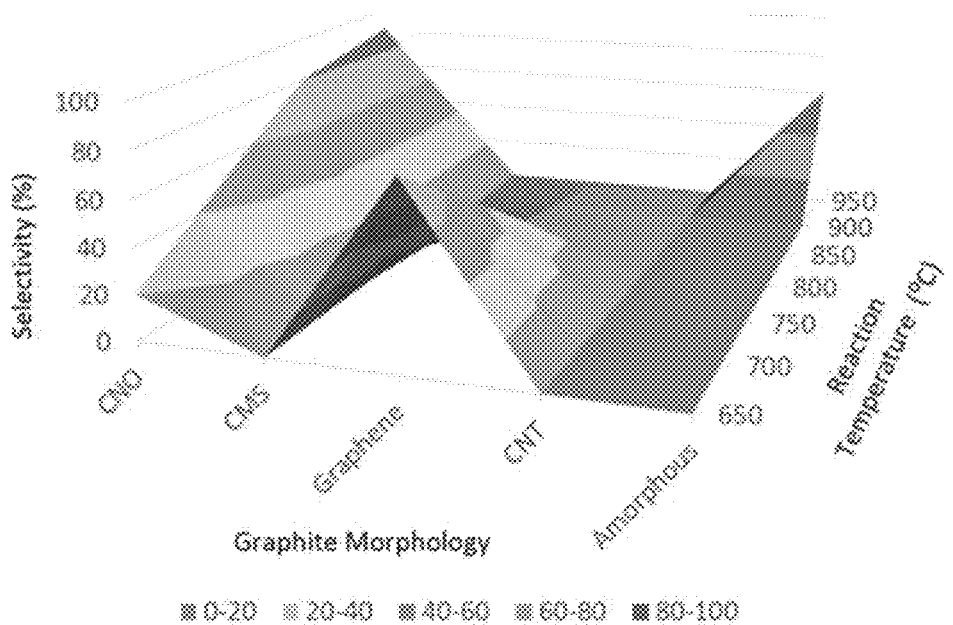
FIG. 4 shows a graphical representation of the graphite morphology against temperature at atmospheric pressure.
Figure 5:
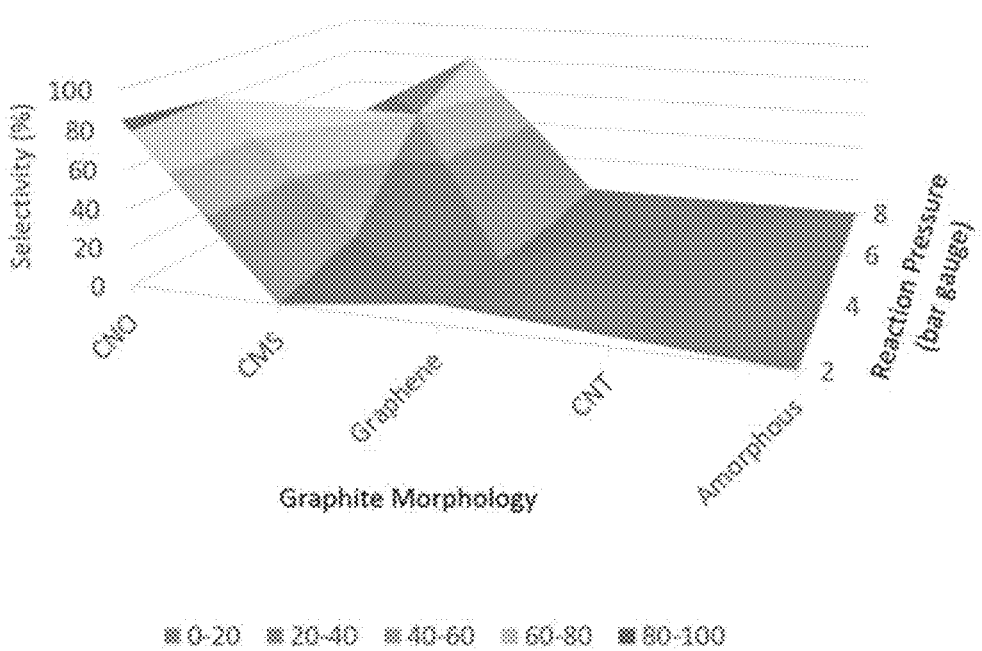
FIG. 5 shows a graphical representation of the graphite morphology against pressure at a temperature of 850° C.

A series of experiments were performed to optimize the production of the desired morphology. FIGS. 4 and 5 show the results of the tests of effect of temperature and pressure on the morphology of the carbon produced. Both of these examples used an analytical grade hematite catalyst ground down to below 5 m.

A series of tests were completed across the temperature range of 650° C. and 950° C. in 50° C. increments and 0 bar(g) to 8 bar(g) in 1 bar increments.

FIG. 4 shows the effect that increasing temperature has on the morphology when the pressure is maintained at constant atmospheric pressure. As can be seen from the results, the lower temperature of –650° C. favored the synthesis of graphene. As the temperature increased, the synthesis of CNOs became favorable.

FIG. 5 shows the effect that increasing pressure has on the morphology when the temperature is maintained at 850° C. As can be seen from the results, the lower pressure favored the synthesis of CNOs. As the pressure was increased, the synthesis of CMSs became favorable.

Table 1 shows the preferred conditions and the range of conditions to selectively synthesize each morphology. The figures in parentheses are the total range of conditions that selectively synthesize the specified morphology. The figure preceding the parenthesis is the inventors understanding of the preferred condition.

TABLE 1

Preferred conditions for each graphite morphology

| | CNO | Graphite Fibers | CMS | Graphene |
|---|---|---|---|---|
| Temperature (° C.) | 900 (700-900) | 800 (700-900) | 900 (800-900) | 650 (650-750) |
| Pressure (bar(g)) | 0 (0-8) | 0 (0-8) | 8 (>4) | 0 |
| Iron Oxide Types | $Fe_2O_3$ (all) | Geothite Iron Ore (all) | $Fe_2O_3$ (all) | $Fe_2O_3$ (all) |
| Selective Synthesis | 90 (20-90%) | 50 (5-50%) | 90 (0-90%) | 80 (0-80%) |
| Yield at Preferred (gC/gFe) | 8 | 4 | 20 | 4 |

CNOs

Figure 6:
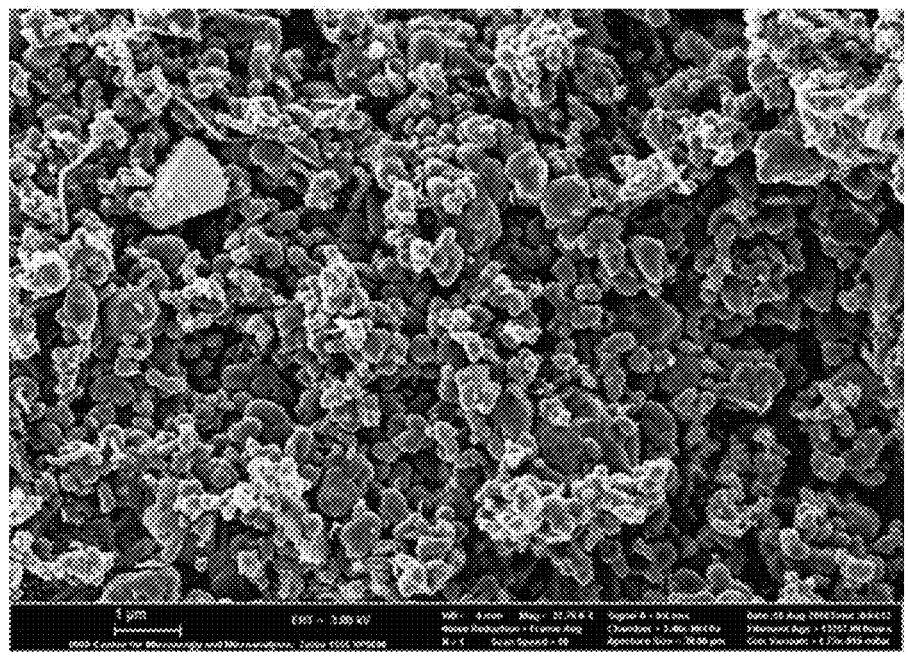
FIG. 6 shows a scanning electron microscope (SEM) image of CNOs produced in accordance with the present invention.
Figure 7:
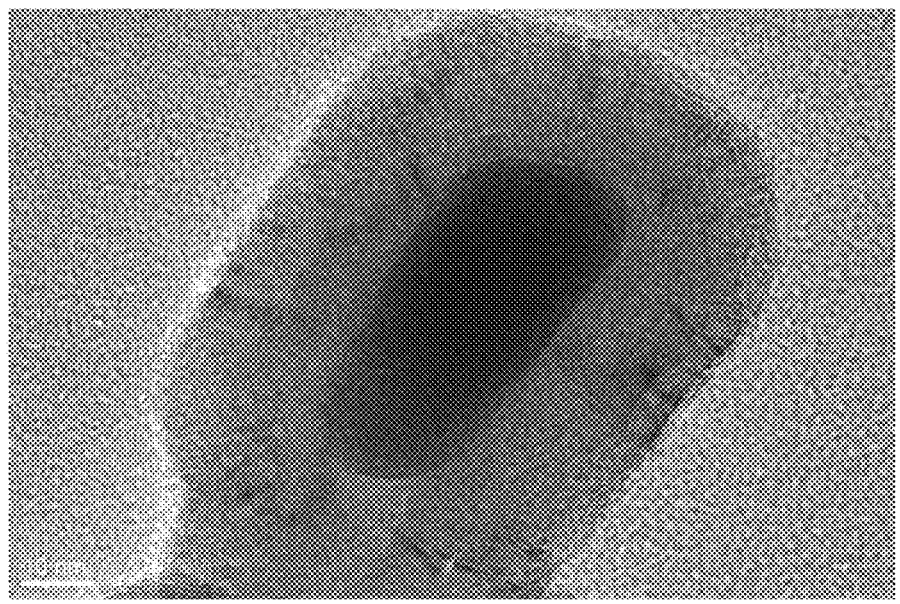
FIG. 7 shows a tunnelling electron microscope (TEM) image of a simple CNO produced in accordance with the present invention.

CNOs were selectively synthesized at approximately 90% using hematite catalyst at 800-900° C. and atmospheric pressure. The yield of CNO after 19 hrs of reaction was approximately 8 grams of CNO per gram of elemental iron. The selectivity for CNOs decreased with increasing pressure and formation of CMS was favored above −4 bar(g). FIG. 6 shows a scanning electron microscope (SEM) image of CNOs produced at 900° C. and atmospheric pressure using hematite iron oxide catalyst. FIG. 7 shows a tunneling electron microscope (TEM) image of a simple CNO produced at 900° C. and atmospheric pressure using hematite iron oxide catalyst.

CMS

Figure 8:
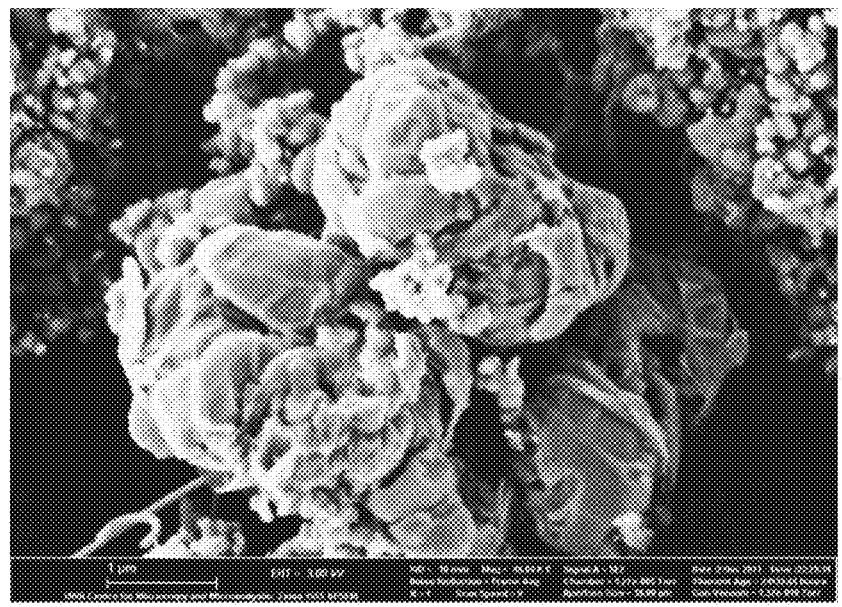
FIG. 8 shows a SEM image of CMS produced in accordance with the present invention.
Figure 9:
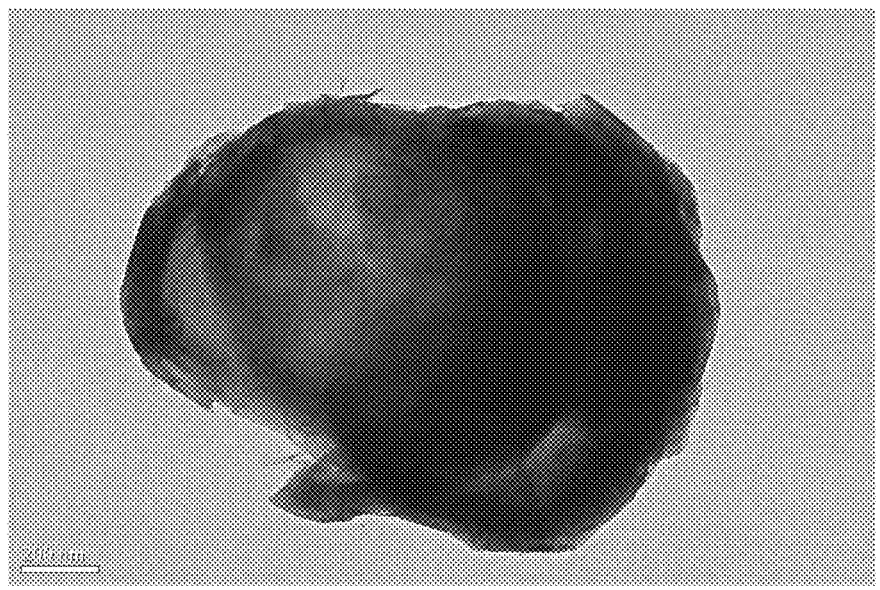
FIG. 9 shows a TEM image of CMS produced in accordance with the present invention.

CMSs were selectively synthesized at approximately 90% using hematite catalyst at 850° C. and 8 bar(g) pressure. These morphologies are only observed at pressures exceeding 4 bar(g). The yield of CMS after 19 hrs of reaction was approximately 20 grams of CMS per gram of iron. FIG. 8 shows a SEM image of CMS produced at 850° C. using hematite iron oxide as catalyst at 8 bar(g) pressure. FIG. 9 shows a TEM image of CMS produced at 850° C. using hematite at 8 bar(g) pressure.

Graphitic Fibers/CNTs

Figure 10:
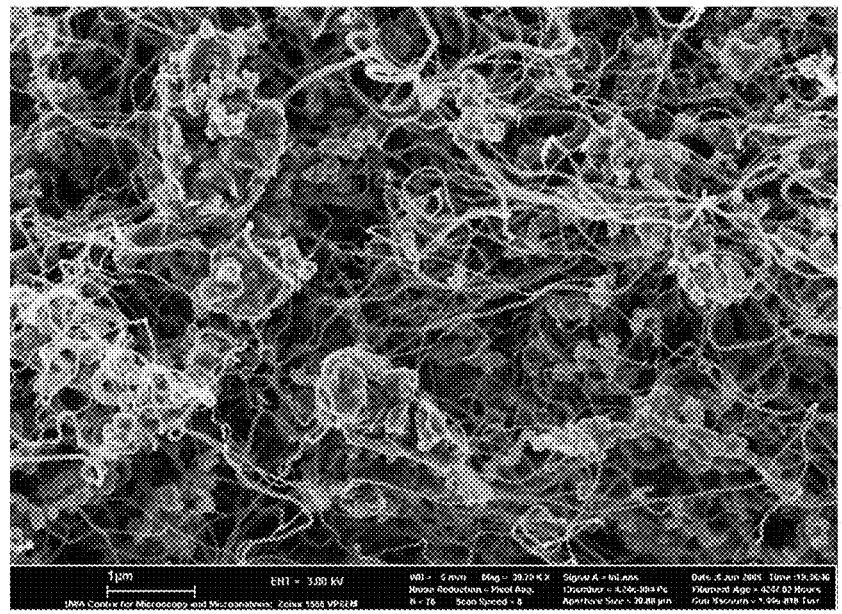
FIG. 10 shows a SEM image of graphitic fibers produced in accordance with the present invention.
Figure 11:
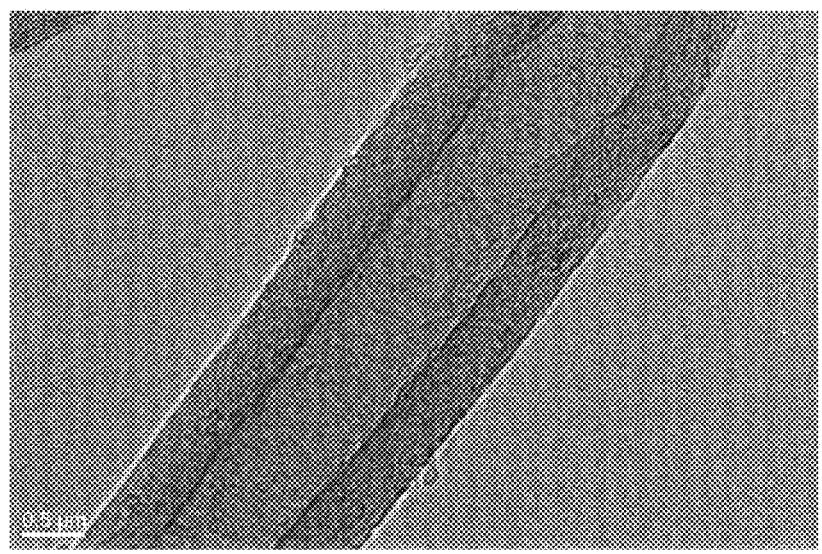
FIG. 11 shows a TEM image of CMS produced in accordance with the present invention.

Graphitic fibers/CNTs were selectively synthesized at approximately 50% using goethite iron oxide catalyst at 800° C. and atmospheric pressure. The yield of CNT after 19 hrs of reaction was approximately 4 grams of CNT per gram of iron. FIG. 10 shows a SEM image of CNT produced at 800° C. using goethite iron oxide as catalyst at atmospheric pressure. FIG. 11 shows a TEM image of CMS produced at 800° C. using hematite iron oxide as catalyst at atmospheric pressure.

Graphene

Figure 12:
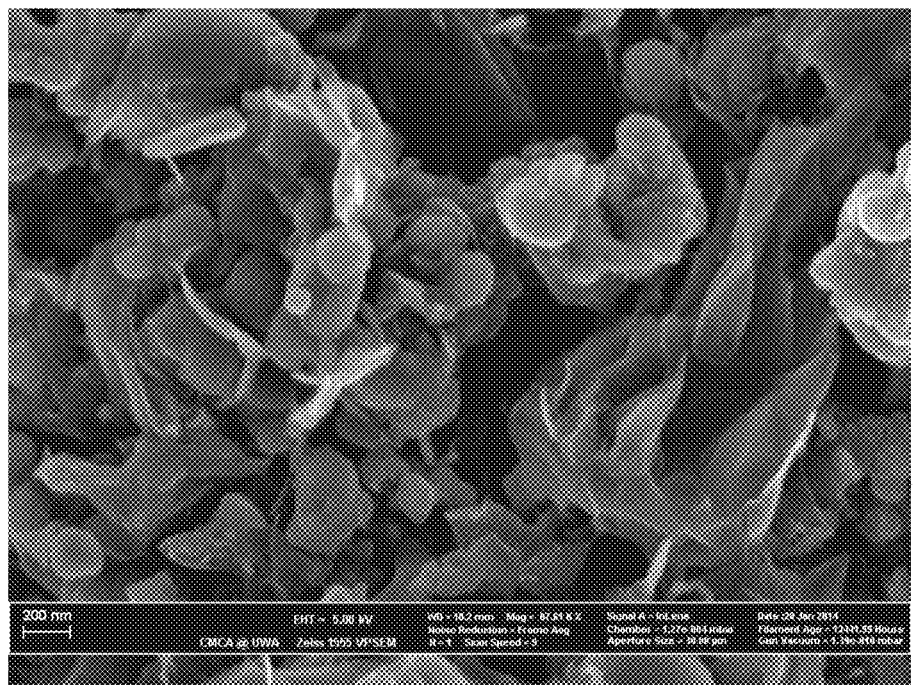
FIG. 12 shows a SEM image of graphitic fibers produced in accordance with the present invention.
Figure 13:
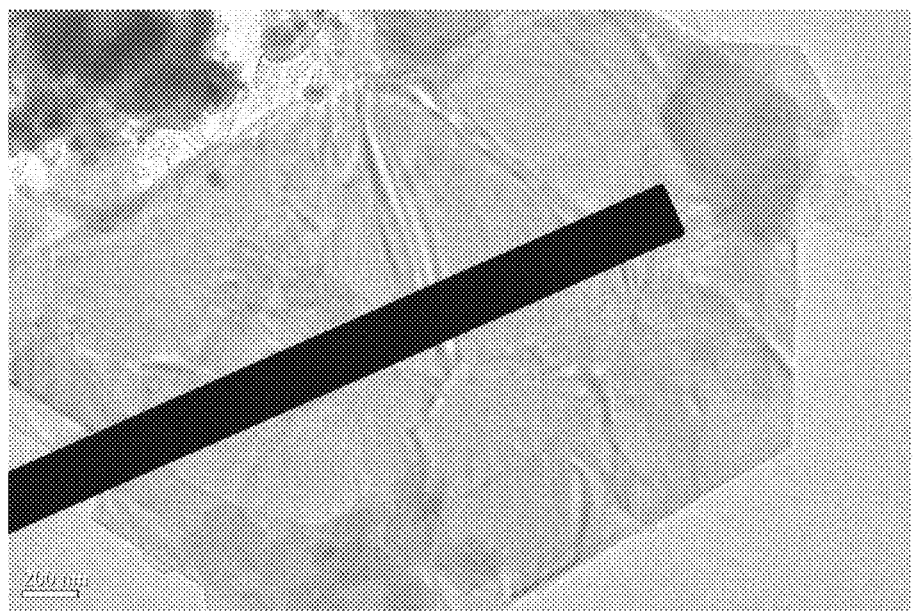
FIG. 13 shows a TEM image of graphene produced in accordance with the present invention.

Graphene was selectively synthesized at approximately 80% using hematite iron oxide catalyst at 650° C. and atmospheric pressure. The yield of graphene after 24 hrs of reaction was approximately 4 grams of graphene per gram of iron. FIG. 12 shows a SEM image of graphene produced at 650° C. using hematite iron oxide as catalyst at atmospheric pressure. FIG. 13 shows a TEM image of graphene produced at 650° C. using hematite iron oxide as catalyst at atmospheric pressure.

TABLE 2

Additional testing for preferred CNO and/or CMS morphologies

| Temp ° C. | Pressure bar(g) | CNO (Sel %) | CNT (Sel %) | CMS (Sel %) | Graphene (Sel %) |
|---|---|---|---|---|---|
| 900 | 4 | 50 | <1 | 50 | <1 |
| 900 | 8 | 10 | <1 | 90 | <1 |
| 800 | 4 | 70 | <1 | 25 | 5 |
| 800 | 8 | 65 | <1 | 30 | 5 |
| 750 | 8 | 80 | 5 | 10 | 5 |

In addition to the experiments set out in Table 1, methane gas was passed over either a synthetic iron oxide or iron oxide ore at the pressures and temperatures shown in Table 2. These results show that at pressures of 4 bar (g) to 8 bar(g) and lower temperatures of 750-800° C., the selectivity for CNO increases. At higher temperatures under the same pressures, the selectivity for CMS increases.

Whilst the present invention is not limited to their use, the applicant has discovered that through the use of non-synthetic catalysts, graphitic solid carbon can be produced cheaply and in an easily scalable method.

Whilst the above examples all use iron oxide samples, it is envisaged that the substitution of iron oxide with other metal-containing catalysts will affect the morphology of the produced graphite. Examples of other metal ores that may be included are nickel, cobalt and gold.

The applicant has discovered that by the selection of the metal-containing catalyst and the reaction temperature and pressure, the morphology of the graphitic solid carbon can be controlled. As shown in the examples, a single catalyst (hematite iron oxide) can be used to selectively produce one of three different morphologies through the control of the temperature and pressure, whilst the substitution of the hematite iron oxide with goethite iron oxide under similar conditions produces a different morphology.

The process of the present invention is particularly advantageous over prior art processes which require specialty, high purity catalysts that are tailored for particular morphologies. Such catalysts, as for example nano-rod $Fe_2O_3$, are very expensive to produce and there are difficulties associated with producing it on a large scale. Along with the increased production expense, these catalysts require specialized inert supports in order to increase the surface area of the active catalyst element, thereby increasing the catalytic activity. Not only do the specialized inert supports add to the cost of the process, but they are tailored to specific catalysts and do not allow for the control of the morphology of the produced graphite. Unlike these prior methods, the process of the present invention can advantageously produce different graphite morphologies, without the necessity of the supported catalyst.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

What is claimed is:

1. A process comprising:
   pre-treating a naturally occurring polycrystalline iron oxide catalyst, wherein the pre-treatment comprises heating;
   providing the pre-treated catalyst to a fluidized bed reactor;
   in the fluidized bed rector, contacting at an elevated temperature, the pre-treated catalyst with a hydrocarbon gas to catalytically convert at least a portion of the hydrocarbon gas to hydrogen and carbon and thereby selectively synthesise carbon material; and
   extracting from the fluidized bed reactor a first stream which includes the synthesised carbon material and a second stream comprising the hydrogen.

2. The process according to claim 1, wherein the elevated temperature is between 600° C. and 1000° C.

3. The process according to claim 1, wherein the contacting occurs at a pressure between 1 bar (g) and 10 bar (g).

4. The process according to claim 1, wherein the synthesised carbon material has a selectively controlled morphology selected from the group of: carbon nano-onions (CNOs), carbon micro-shells (CMSs), and graphene.

5. The process according to claim 1, wherein the iron oxide catalyst is selected from $Fe_2O_3$, $Fe_3O_4$, and mixtures thereof.

6. The process according to claim 1, wherein the iron oxide catalyst is hematite iron ore.

7. The process according to claim 1, wherein the iron oxide catalyst is unsupported.

8. The process according to claim 1, wherein the iron oxide catalyst is supported on a support.

9. The process according to claim 8, wherein the support is of the same chemical composition as the metal-containing catalyst.

10. The process according to claim 1, wherein the hydrocarbon gas is methane.

11. The process according to claim 1, wherein the hydrocarbon gas is natural gas.

12. The process according to claim 1, wherein CNOs are selectively synthesised by the step of:
   contacting at elevated temperature the iron oxide catalyst with a hydrocarbon gas to catalytically convert at least a portion of the hydrocarbon gas to hydrogen and carbon,
   wherein the contact is conducted at a temperature ranging from 700° C. to 900° C. and a pressure ranging from 1 bar (g) to 8 bar (g).

13. The process according to claim 12, wherein the temperature ranges from 800° C. to 900° C. and wherein the pressure ranges from 2 bar (g) to 4 bar (g).

14. The process according to claim 1, wherein CMS is selectively synthesised by the step of:
   contacting at elevated temperature the iron oxide catalyst with a hydrocarbon gas to catalytically convert at least a portion of the hydrocarbon gas to hydrogen and carbon,
   wherein the contacting is conducted at a temperature ranging from 800° C. to 900° C. and a pressure ranging from 4 bar (g) to 9 bar (g).

15. The process according to claim 14, wherein the temperature ranges from 850° C. to 900° C. and wherein the pressure ranges from 6 bar (g) to 8 bar (g).

16. The process according to claim 1, wherein graphene is selectively synthesised by the step of:
   contacting at elevated temperature the iron oxide catalyst with a hydrocarbon gas to catalytically convert at least a portion of the hydrocarbon gas to hydrogen and carbon,
   wherein the contacting is conducted at a temperature ranging from 600° C. to 750° C. and pressure of about 1 bar (g).

17. The process according to claim 16, wherein the temperature ranges from 600° C. to 700° C.

* * * * *